United States Patent [19]

Tracy

[11] 4,310,025

[45] Jan. 12, 1982

[54] SPOOL TYPE FLUID CONTROL VALVE

[75] Inventor: Gene A. Tracy, Amery, Wis.

[73] Assignees: The Coca-Cola Company, Atlanta, Ga.; The Cornelius Company, Anoka, Minn.

[21] Appl. No.: 116,375

[22] Filed: Jan. 29, 1980

[51] Int. Cl.³ .................................................. F16K 3/24

[52] U.S. Cl. ........................... 137/625.48; 137/625.69; 251/367; 251/DIG. 1

[58] Field of Search ....................... 137/625.69, 625.48; 251/367, DIG. 1

[56] References Cited

U.S. PATENT DOCUMENTS

| | | | |
|---|---|---|---|
| 3,661,182 | 5/1972 | Loveless | 137/625.48 |
| 3,819,152 | 6/1974 | Clippard | 251/367 |
| 4,026,325 | 5/1977 | Loveless | 137/625.69 X |
| 4,187,884 | 2/1980 | Loveless | 137/625.69 |

FOREIGN PATENT DOCUMENTS

| | | | |
|---|---|---|---|
| 830925 | 3/1960 | United Kingdom | 137/625.69 |

*Primary Examiner*—Arnold Rosenthal

*Attorney, Agent, or Firm*—Henry C. Kovar

[57] ABSTRACT

A spool type fluid control valve having a body, an elongate bore within the body, ports transverse to and into the bore, and a spool with seals reciprocable in the bore has the improvement of a concave seal pocket in an end of the body, a concave seal pocket in a valve cap at the other end of the body, each pocket is of substantially the same diameter as the bore and has a depth sufficient for receiving a shaft seal, a fluid port is formed between the elongate bore and each seal pocket and a toroidal plenum chamber is in communication with and between each fluid port and a fluid conduit through the body.

14 Claims, 11 Drawing Figures

SPOOL TYPE FLUID CONTROL VALVE

BACKGROUND OF THE INVENTION

1. Field of the Invention

This invention pertains to a method of and apparatus for making and dispensing carbonated beverage in which carbon dioxide gas is firstly utilized for propelling flat water and then exhausted into the propelled water and utilized for carbonation of the water; the apparatus also pertains to a double acting fluid pump and a pneumatic control valve.

2. Description of the Prior Art

Chamberlain U.S. Pat. No. 27,775 is the earliest known device which utilizes carbon dioxide gas for both a water propellant and carbonating gas. Chamberlain has a reciprocating double piston pump and uses gas to pump flat water into an ice cooled receiver. Used propellant gas is also exhausted into the receiver. The receiver stores a supply of water for dispensing; there is little or no control of carbonation quantity, of pressures, and no automatic operation.

H. S. Elworthy U.K. Pat. No. 20,478 uses carbon dioxide storage bottle pressure and gas at 50 to 60 atmospheres to propel water into a carbonator. The propellant gas is exhausted into the carbonator. Again, there appears to be little or no control of carbonation, and the device looks to be unacceptably dangerous because of the pressures utilized.

C. A. Brown U.S. Pat. No. 2,604,310 is similar to Chamberlain, and provides automatic operation. There is no provision for carbonation control, nor for efficiency.

Tremolada U.S. Pat. No. 3,756,576 utilizes carbon dioxide from a carbonated water storage vessel to propel water into a carbonator. This device is very wasteful of gas.

The known prior art has not been able to dispense both a carbonated or non-carbonated beverage. They have no provision for precise, predetermined carbonation, nor provision for carbonation other than static exposure of exhausted gas to propelled water.

OBJECTS OF THE INVENTION

It is an object of the present invention to provide an improved method of and apparatus for making and dispensing carbonated water, utilizing carbon dioxide gas for firstly propelling flat water, then exhausting the gas into direct contact with the propelled water, and subsequently carbonating the water with this gas.

It is an object of the present invention to provide an improved method of and apparatus for making and dispensing carbonated water, in which carbon dioxide gas is first utilized for propelling flat water, then exhausted into the propelled water, with common admittance of the water and exhausted carbon dioxide into a carbonator.

It is an object of the present invention to provide an improved method of and apparatus for making and dispensing carbonated water in which the pressure of carbon dioxide gas to be used for carbonation is combined with the pressure of a municipal water supply, for propelling flat water into a carbonator.

It is an object of the present invention to provide an improved method of and apparatus for making and dispensing carbonating water, in which carbon dioxide gas is utilized to propel flat water either to a carbonator or to a dispensing head, with all of the gas going to the carbonator after being used as a propellant.

It is an object of the present invention to provide an improved method of and apparatus for making and dispensing carbonated water, in which carbon dioxide gas is used for propelling flat water through a cooler, then exhausted into the cooled water, and in which the water and exhausted gas are intermixed at a pressure greater than an equilibrium carbonation pressure under which they are subsequently stored.

It is an object of the present invention to provide an improved apparatus for making and dispensing carbonated water in which carbon dioxide gas is used as a propellant for flat water with both the water and used gas being directed into a carbonator, and with all excess carbon dioxide being discharged from the carbonator after passage therethrough.

It is an object of the present invention to provide an improved pneumatically powerable double acting fluid pump.

It is an object of the present invention to provide a double acting fluid pump having an improved control mechanism.

It is an object of the present invention to provide an improved fluid valve, for controlling flow of pressurized gas.

It is an object of the present invention to provide a new end port construction in a spool type fluid valve which provides a substantially shorter and smaller spool valve.

SUMMARY OF THE INVENTION

In accordance with the principles of the present invention, a method of making and dispensing carbonated water has the steps of propelling flat water into a carbonator with carbon dioxide gas at a propellant pressure, pressurizing the carbonator at a storage pressure less than the propellant pressure, exhausting used propellant gas into the water prior to entry of the water into the carbonator, commonly admitting the water and gas into the carbonator, mixing the exhausted gas and water together, and storing and dispensing the water under the storage pressure; apparatus for making and dispensing carbonated water has a pneumatically powerable water pump, a carbonator, a propelled water conduit connecting the pump to the carbonator, a carbon dioxide gas conduit has a propellant outlet connected to a pump gas inlet and a propellant pressure regulator and a storage outlet connected to the carbonator and a storage pressure regulator, there are cooling means in the water conduit, and a propellant gas exhaust conduit connects a pump gas outlet to the propelled water conduit downstream of the cooling means and upstream of the carbonator.

The pneumatically powerable pump has first and second opposed cylinders, a piston dividing each cylinder into two chambers, an elongate piston rod fastened to both pistons, and means fastening the cylinders together; discrete inventive aspects of the pump include spacers on the fastening means and between the cylinders with a control valve mounting cradle carried by the fastener means and fixed by slots in the spacers, a fluid intake manifold and a fluid outlet manifold in between inboard cylinder heads of the opposed cylinders with check valves between the heads and the manifolds, and an improved pump control mechanism having a cradle mounted to the pump and supporting a pump control valve and a two-legged flip-flop actuator yoke and means for bi-stably biasing the actuator yoke.

A spool type fluid valve controls the pump, and has a body, a sleeve within the body and having a valve bore therein, at least one transverse fluid port into the bore, and a reciprocable spool in the bore and having at least one seal thereon; the valve has the improvement of a concave seal pocket beyond the end of the bore and into which the spool seal is reciprocably recievable from the bore, a fluid port between the pocket and the bore, and a passageway fluidly connecting this fluid port to a fluid conduit leading from the body.

DESCRIPTION OF THE PREFERRED EMBODIMENT

Figure 1:
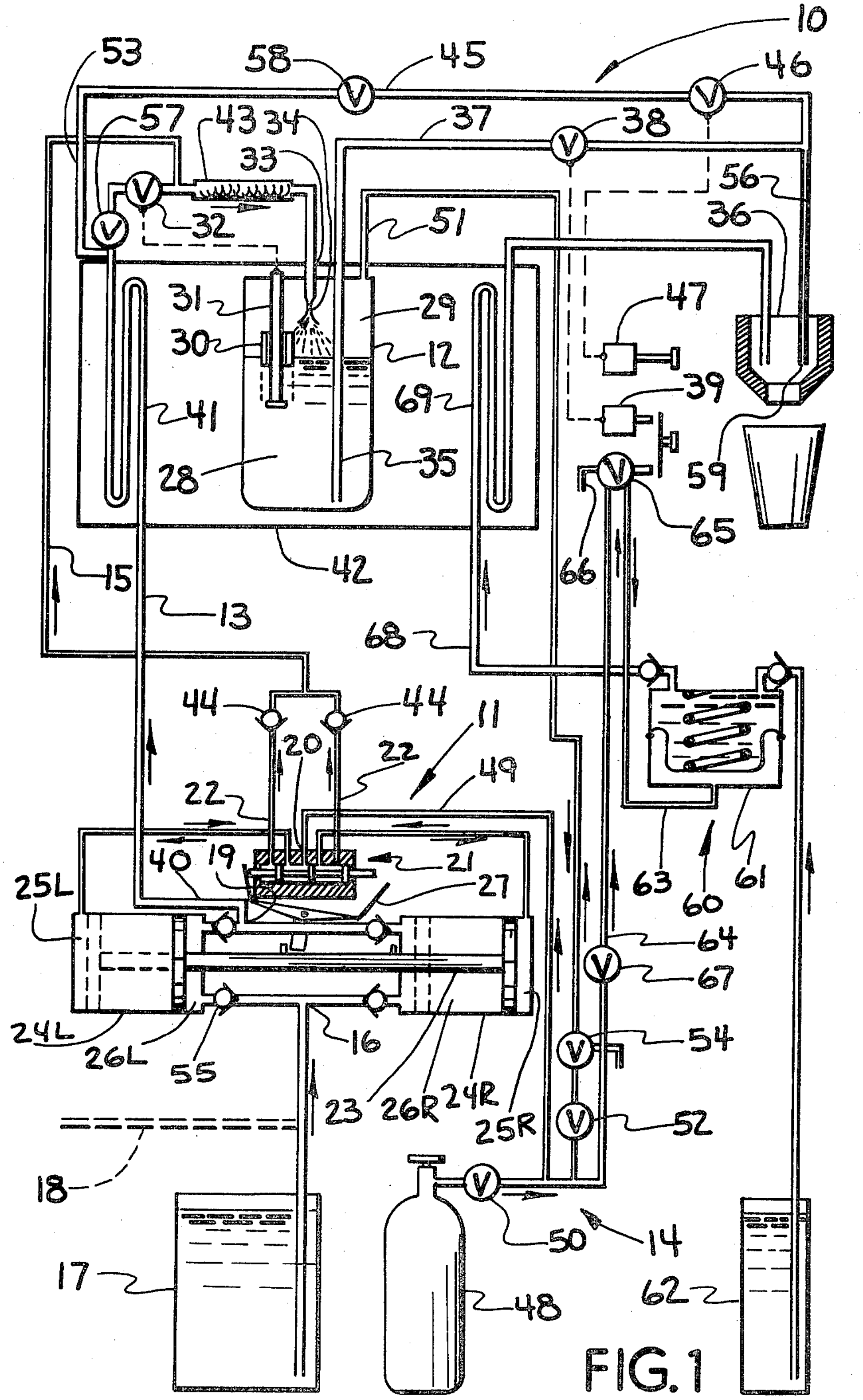
FIG. 1 is a fluid schematic of the preferred embodiment of the apparatus of the present invention, with which the method of the present invention may be practiced.
Figure 2:
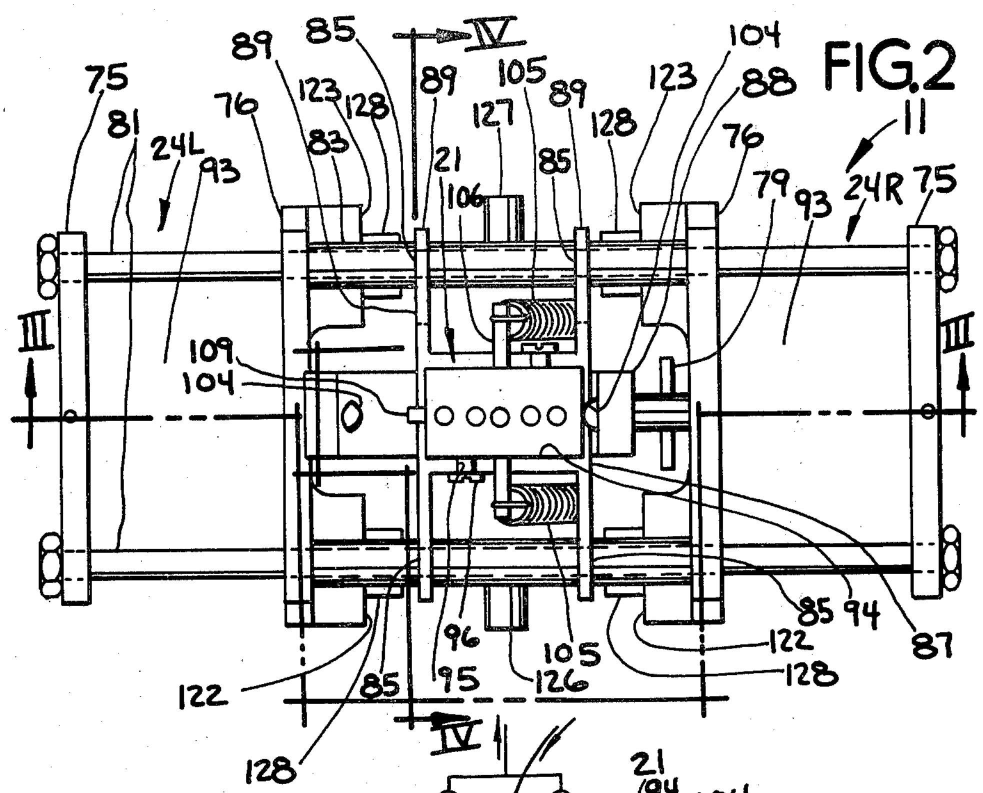
FIG. 2 is a horizontal plan view of the preferred embodiment of a fluid pump according to the present invention and as utilized in the apparatus of FIG. 1.

The present invention is particularly useful when embodied in an apparatus for making and dispensing carbonated water, generally indicated by the numeral 10 in FIG. 1. The apparatus 10 includes a pneumatically powerable water pump 11, a carbonator 12, a propelled water conduit 13 connecting the water pump 11 to the carbonator 12, a gas conduit 14 connecting the water pump 11 to the carbonator 12 and a propellant gas exhaust conduit 15 connecting the water pump 11 to the carbonator 12.

The water pump 11 has a water inlet 16 connectible to a source of flat water. The flat water source may be either of a water container 17 having water under atmospheric pressure, or a pressurized municipal water supply 18 if municipal pressure is available and preferable to use as a supply. Closed and pressurized containers of water may be substituted for the open container 17 if economically and/or hygienically preferable. A water outlet 19 connects the water pump 11 to the propelled water conduit 13, a gas inlet 20 in a pump control valve 21 connects the water pump 11 to the gas conduit 14, and gas outlets 22 from the control valve 21 connect the water pump 11 to the gas exhaust conduit 15. Within the water pump 11 there is reciprocable double ended piston assembly 23 within a pair of cylinders 24L, 24R. The piston assembly 23 divides each of cylinders 24L, 24R into a gas power chamber 25 and a water pump chamber 26, while physically separating water from propellant gas. A bi-stable valve actuator mechanism 27 operatively connects the piston assembly 23 to the control valve 21.

The carbonator 12 is a pressure vessel having a reservoir 28 for carbonated water, and a gas space 29 above the reservoir 28. A level sensor 30 follows the water level up and down within the carbonator 12 and activates a switch 31 which is operatively connected to open a normally closed water inlet and fill valve 32 in the propelled water conduit 13. The carbonator inlet 33 has a restrictor spray nozzle 34 in the gas space 29 and in common fluid communication with both of the exhaust gas conduit 15 and the propelled water conduit 13 for common admittance of both water and carbon dioxide into the gas space 29 of the carbonator 12 as a fine spray. A carbonator outlet 35 is connected to a dispensing nozzle 36 by a carbonated water dispensing conduit 37 having a normally closed dispensing valve 38 connected to and under the operative control of a dispensing actuator 39 and a dispensing restrictor line 56 is physically sized for giving a predetermined volumetric rate of dispensing flow from the carbonator 12 into the dispensing nozzle 36. A specific preferred sizing of the dispensing line 56 is 0.108 inch (2.75 mm) inside diameter by 12 inches (305 mm) long.

The propelled water conduit 13 has an inlet end 40 connected to the pump water outlet 19, and a cooling coil 41 immersed in a refrigeration bath 42 of ice water and ice. Downstream of the normally closed fill valve 32, and upstream of the restrictor spray nozzle 34 is a turbulator 43 which is a series of baffles for violent churning and agitating flowing water and carbon dioxide gas in the water conduit 13. The propellant gas conduit 15 fluidly connects into the propelled water conduit 13 downstream of the fill valve 32 and upstream of the turbulator 43 and the restrictor spray nozzle 34. A carbonator filling flow control 57 is upstream of the turbulator 43 and the connection of the exhaust gas conduit 15 to the propelled water conduit 13, and preferably also upstream of the fill valve 32. The filling flow control 57 is structured or set to give a predetermined volumetric rate of water flow from the pump 11 into the carbonator 12 which is substantially less than a predetermined volumetric flow rate through the dispensing restrictor line 56. Check valves 44 in the exhaust gas conduit 15 preclude water flow from the water conduit 13 through the exhaust gas conduit 15 and into the pump 11 or its operating valve 21, as well as precluding flow of exhausted carbon dioxide gas back into the pump 11 after the gas has been used as the propellant.

A flat water dispensing conduit 45 has an inlet end 53 fluidly connected into the propelled water conduit 13 downstream of the cooling coil 41, the upstream of the carbonator fill valve 32 and flow control 57. The flat water dispensing conduit 45 has a flat water flow control 58 structured or set to give a predetermined volumetric flow rate greater than the volumetric flow rate of the carbonator filling flow control 57 and at least equal to the normal volumetric rate of flow effected by the dispensing restrictor line 56, and a discretely operable, normally closed dispensing valve 46 which is operatively connected to be opened by an actuator 47. The flat water conduit 45 is connected to the dispensing restrictor line 56 of the carbonated water dispensing conduit 37 and both carbonated and flat water share the dispensing restrictor line 56 and a common water outlet 59 in the dispensing head 36.

The gas conduit 14 is connectible to a high pressure source of carbon dioxide gas 48 and has a first outlet 49 connected to the water pump gas inlet 20, a propellant pressure regulator 50 for regulating a predetermined pneumatic propellant pressure at the pump 11, a second gas outlet 51 fluidly connected into the carbonator gas space 29, and a storage pressure regulator 52 for regulating a predetermined pneumatic storage pressure within the carbonator 12. An automatic venting valve 54 in fluid communication with the carbonator gas space 29 vents gas from the space 29 when the pressure in the carbonator 12 exceeds the preset pressure of the storage pressure regulator 52.

A concentrate dispenser 60 includes a pneumatically powerable concentrate pump 61 which draws from a concentrate container 62 which preferably is at atmospheric pressure. Power for the concentrate pump 61 comes from propellant carbon dioxide gas from the gas source 48. A concentrate gas conduit 63 to the concentrate pump 61 has an inlet conduit 64 fluidly connected to the main gas conduit 14 at pressure regulator 67.

A concentrate control valve 65 normally closes the concentrate gas inlet conduit 64 and vents the concentrate pump 61 to atmosphere via an open port 66. The valve 65 and dispensing actuator 39 are commonly actuatable. When the concentrate control valve 65 is actuated, the vent 66 is closed and the conduits 63, 64 are fluidly connected which fluidly connects the concentrate pump 61 to the concentrate propellant pressure regulator 67. Concentrate is propelled from the pump 61 to the dispensing nozzle 36 through a concentrate dispensing conduit 68 having a cooling coil 69 in the refrigeration bath 42.

In the use and operation of the apparatus 10, and in operation of the method of making and dispensing carbonated water according to the present invention and utilizing the apparatus 10, flat water is in water container 17, high pressure carbon dioxide is in the gas source 48 and beverage concentrate is in the concentrate container 62. A specific example of a beverage concentrate is a soft drink syrup to be mixed one part with five parts of water. Both the flat water in the container 17 and concentrate in the container 62 may be under atmospheric pressure and be at ambient temperature. The propellant pressure regulator 50 is set at a predetermined propellant pressure of 120 PSIG (828 kPa), and the storage pressure regulator 52 is set at a predetermined storage pressure of 25 PSIG (172 kPa), which is less than the propellant pressure and which gives an equilibrium saturation in the carbonator 12 of about 4½ volumes of carbonation at zero degrees C. The concentrate pump pressure regulator 67 is set at a predetermined 50 PSIG (344 kPa). The carbonator filling flow control 57 is sized or set to give a volumetric flow rate of 0.8 ounces (24 cc) per second, the flat water flow control 58 is sized or set to give a volumetric flow rate of 1.25 ounces (40 cc) per second. Both of these flow controls 57, 58 are responsive to pressure surges from the pump 11 and maintain their predetermined volumetric flow rates during pressure surge or drop in the propelled water conduit 13 as a consequence of the pump 11 changing direction of reciprocation. Under the relatively constant predetermined 25 PSIG (172 kPa) pneumatic pressure in the carbonator 12, the sized dispensing restrictor line 56 effects a predetermined flow rate of 1.25 ounces (40 cc) per second, this flow rate is at least equalled by the flat water flow control 58. The refrigeration bath 42 maintains a reserve of ice for cooling water in the water coil 41 and syrup in the coil 69. The apparatus 10 is primed by individual operation of the carbonated water actuator 39, and then the concentrate control valve 65.

To dispense carbonated water the dispensing actuator 39 is operated and it in turn effects opening of the dispensing valve 38. Carbonated water in reservoir 28 under the relatively constant 25 PSIG (172 kPa) of carbon dioxide gas in the gas space 29 and at the equilibrium pressure for a desired carbonation of the water is pushed out the dispensing conduit 37 to the nozzle 36 and through the dispensing restrictor line 56 at a predetermined volumetric flow rate of 1.25 ounces (40 cc) per second. Carbonated water may thus be discretely dispensed. Dispensing concentrate concurrently with carbonated water gives a flavored beverage. When the control valve 65 is actuated and the 50 PSIG (344 kPa) gas pressure from regulator 67 is fluidly connected to the concentrate pump 61, concentrate is pneumatically pumped to the nozzle 36 at a predetermined volumetric flow rate properly ratioed to the carbonated water dispensing rate. Water and concentrate are combined in the nozzle 36 and dispensed as a beverage.

Carbon dioxide gas is supplied as a propellant gas at the predetermined propellant pressure into the pump 11 under the control of the valve 21. The piston assembly 23 is driven back and forth by propellant gas and when the assembly 23 reaches the end of its stroke, it trips the bi-stable valve 21 and reverses its stroke and reciprocates in the other direction.

The pump control valve 21 is schematically shown in FIG. 1 with its spool in the right position. In this right position, propellant gas under propellant pressure is admitted from outlet 49 to the left gas power chamber 25L and used propellant carbon dioxide gas is exhausted from the right gas power chamber 25R through valve 21 and out the exhaust conduit 15. The pneumatic pressure is biasing the piston assembly 23 to the right and water is being propelled out of the left water pump chamber 26L and being drawn into the right water pump chamber 26R. As the piston assembly 23 nears the end of its rightward stroke, it will move the spool of valve 21 to the left and disconnect the left gas power chamber 25L and fluidly connect the right gas power chamber 25R to the propellant conduit 14. Virtually simultaneously, the left gas power chamber 25L will be fluidly connected to the exhaust conduit 15 and the used carbon dioxide propellant gas will be exhausted. The piston assembly 23 is then biased toward and moves to the left and water is pumped from the right water pump chamber 26R and drawn into the left water pump chamber 26. This reciprocating motion and pumping continues automatically in response to flow and pressure drop in the water conduit 13. Specifically, if there is no flow in conduit 13 by virtue of valve 32 being closed, the piston assembly 23 does not move, whereas if valve 32 is open and water flows, the piston assembly 23 responsively moves to effect the water flow. Movement and actuation of the control valve 21 is completely automatic and responsive to movement of the piston assembly 23 as a result of the level control and switch 30, 31 calling for filling of the carbonator 12 and opening the fill valve 32.

Water being pumped and propelled through the pump 11 is essentially at ambient temperature. As the water is propelled it is pushed through the cooling coil 41 and cooled to near 0° C., and then propelled through the fill valve 32. As the water comes out of the fill valve 32, it comes into direct contact with the used and exhausted carbon dioxide propellant gas, all of which is unobstructively exhausted through the exhaust conduit 15 into the propelled water conduit 13. The common flow of cooled water and exhausted gas then continues through the turbulator 43, and through the carbonator inlet 13 and spray nozzle 34. The restrictor spray nozzle 34 backs up the flow and pressure of the water and gas and elevates the pressure in the turbulator 43 to about 50 PSIG (344 kPa) during flow and filling of the carbonator 12. The water and exhausted carbon dioxide propellant gas are confined together in direct intimate contact with one another and are turbulently churned and agitated together as they concurrently pass together through the turbulator 43 under the backed up pressure. The backed up pressure in between the fill valve 32 and the restrictor spray nozzle 34 during the filling of carbonator 12 is at a pressure level in between the propellant gas pressure at the water pump 11 and the storage pressure in the carbonator 12, and is substantially greater than the storage pressure which is also the final and intended equilibrium pressure for dispensing. Specifically, this backed-up pressure under which the water and exhausted gas are turbulently mixed is about twice the equilibrium pressure under which the water will be stored and dispensed after the turbulent agitating. For maximizing carbonation, all of the used propellant carbon dioxide gas is exhausted into the cooled propelled water, and all of the exhausted gas and all of the propelled water are mixed together and commonly admitted together into the carbonator 12 by commonly spraying them in a fine mist out of the restrictor spray nozzle 34 and through the carbonator gas space 29.

When the level sensing float 30 rises to a predetermined level, the switch 31 is opened and the fill valve 32 is closed. Propelled water in the conduit 13 upstream of the fill valve 32 is hydrostatically stopped up and the piston assembly 23 becomes hydrostatically locked in place as water flow ceases. All dispensing from the apparatus 10 is from the carbonator 12 under the pneumatic storage pressure of carbon dioxide gas in the gas space 29. As the water level in the carbonator 12 drops during dispensing, the float 30 will follow the water level down and close the switch 31 and open the fill valve 32. Water flow will begin and the piston assembly 23 will automatically begin to reciprocate and propel water to the carbonator 12. The volumetric flow rate of water being withdrawn during dispensing from the carbonator 12 substantially exceeds the volumetric flow rate allowed by the filling flow control 57 into the carbonator 12 from pump 11, and the balance of the carbonated water needed for dispensing is taken from the reservoir 28. The pump 11 operates smoothly and does not complete refilling of the carbonator 12 during dispensing but rather catches up and completes filling of the carbonator 12 after dispensing has been terminated. This precludes intermittent or repetitively intermittent pump 11 operation during dispensing.

All of the propellant carbon dioxide gas is exhausted into the carbonator 12. Excess used propellant carbon dioxide gas is automatically vented out of the carbonator 12 by the vent valve 54 when the pressure in the carbonator 12 exceeds the predetermined storage pressure by more than 3 PSI (21 kPa). This excess carbon dioxide is vented to atmosphere so that the predetermined equilibrium storage pressure is maintained within the carbonator 12. An unexpected phenomenon that has been observed is that entrained atmospheric air and other gases which are found in relatively great amounts in municipal water and also in lesser amounts in free standing water, are significantly expelled from the water and then vented from the carbonator 12 via the vent valve 54. These gases are vented simultaneously with excess propellant gas. It has been found that the presence of entrained air and other gas in water is detrimental to both carbonation quantity and to taste of carbonated water and soft drinks. Expelling and venting of the entrained air and other gases prior to or during carbonation has been found to produce a higher level of carbonation than has been produced when the air and gas are not expelled and vented. As this phenomenon is best understood, the flow of excess propellent carbon dioxide gas through the carbonator 12 purges the carbonator 12 of atmospheric air. When the pump 11 is not operating, the turbulator 43 is self draining and empties into the carbonator 12. When the pump 11 is operating, incoming water is firstly violently churned in the turbulator 43 and then sprayed out of the nozzle 34. Both the churning and spraying are through and in an atmosphere of carbon dioxide gas which is substantially devoid of the other constituents of atmospheric air and other spurious gases found in flat water. Apparently in the absence of the normal atmospheric partial pressures of these gases, the water is simultaneously degassed of gases other then carbon dioxide while at the same time carbon dioxide is taken into solution. While this degassing is partial and may not be complete, it is of a quantity sufficient to product higher carbonation and better taste than previously attained.

Cooled and non-carbonated water may also be selectively dispensed rather than carbonated water. When the flat water dispensing valve 46 is opened, the pump 11 begins to operate as previously described and water is propelled through the conduit 13 and cooling coils 41. The cooled water is selectively diverted out of the conduit 13 downstream of the cooling coil 41 after cooling and prior to coming into contact with carbon dioxide gas. The diverted water is routed through the flat water flow control 58 and the dispensing valve 46 and dispensing conduit 45 to the nozzle 36. During this diversion and dispensing of flat water, the pump 11 changes speed and reciprocates almost twice as fast as it does during refill to the carbonator 12. If flat water is being dispensed simultaneously with filling of the carbonator 12, the pump 11 further speeds up to almost three times its normal rate of reciprocation. When the fill valve 32 is closed, the entire flow of water in the conduit 13 is selectively divertable for dispensing without carbonation. During this step of diverting flat water, carbon dioxide gas is still being used as propellant and after usage as propellant, it is exhausted through the exhaust conduit 15 and into the carbonator 12. As the pressure in the carbonator 12 builds up, the vent valve 54 opens and vents the exhausted propellant gas from the carbonator 12 during the selective diversion. This venting of used propellant carbon dioxide gas through the carbonator during dispensing of flat water, further purges the carbonator 12 of gases previously expelled from the water and further reduces the partial pressure of these expelled and undesirable gases in the carbonator 12.

It has been found that the total quantity of carbon dioxide gas utilized for propellant is about twice the quantity required for carbonation. After the required quantity is taken into solution for forming carbonated water, an approximately equal quantity is vented through the turbulator 43, water inlet 33, nozzle 34 and carbonator 12 to purge the atmosphere in the gas space 29.

Municipal water pressure may be utilized to partially propel flat water and to reduce consumption of carbon dioxide gas when a pressurized municipal supply 18 is available and connected to the water inlet 16 and alternatively utilized to replace the open water container 17. It was explained that the propellant pressure regulator 50 was set at 120 PSIG (828 kPa). This pressure, specifically 120 PSIG (828 kPa) is desired as a predetermined gross propellant pressure when pressurized municipal water is used. The municipal water pressure and propellant gas pressure are combined to total the gross propellant pressure. For example, when the municipal water pressure is 20 PSIG, the propellant pressure regulator 50 is adjusted to a pressure of 100 PSIG, giving a 120 PSIG gross propellant pressure; when the municipal water pressure is 40 PSIG the regulator 50 is adjusted to 80 PSIG giving the same gross propellant pressure of 120 PSIG. The full entirety of the municipal water pressure is applied upon water being propelled and the pressure of the carbon dioxide propellant gas is adjusted to the minimum possible value pressure at regulator 50, which in combination with the municipal water pressure equals the predetermined gross propellant pressure. The municipal water pressure is applied upon the propelled water in the pump 11 through the piston assembly 23. As shown in FIG. 1, water is being pumped from the left water pump chamber 26L and the right pump chamber 26R is being filled. The propellant gas pressure in the left power chamber 25L is substantially higher than the municipal water pressure and overcomes the municipal water pressure and effects automatic closing of a check valve 55 on the water inlet to the left power chamber 25L. This by itself pressurizes the water in the left pump chamber 26L to the pressure of the propellant gas. The right water pump chamber 26R is being filled by incoming water at the municipal pressure and this pressure is applied against the piston assembly 23 and water in the left water chamber 25L, boosting the propelled water pressure and giving in combination with the gas propellant pressure, the gross propellant pressure. Used carbon dioxide propellant gas is exhausted directly into the water between the fill valve 32 and turbulator 43 as the water is being propelled by the propellant gas pressure and municipal water pressure in combination commonly and concurrently through the restrictor spray nozzle 34. The municipal water used for boosting and propelling will subsequently be propelled as the flat water for the carbonator 12 when the piston assembly 23 reciprocates. Each quantity of propelled water will have been previously used during and for boosting. Flat cooled water may also be dispensed, as previously described, when boosting with municipal water pressure.

The flows of carbonated and flat water may be combined to form a low-carbonation soft drink by concurrently opening both dispensing valves 38, 46.

The water pump 11, as shown in FIGS. 2–6, has first and second cylinders 24L, 24R, which are opposed to one another on a common centerline axis with each cylinder 24L, 24R having an outboard head 75 on the cylinder outer end, an inboard head 76 on the cylinder inner end and a tubular cylinder 93 between its heads 75, 76. The piston assembly 23 has two pistons 77, there being one piston 77 in each cylinder 24L, 24R, and an elongate piston rod 78 projecting through both of the inboard heads 76. The piston rod 78 and pistons 77 are rigidly fastened together, and a pair of drive pins 79, 80 spaced from each other symmetrically on each side of the fore/aft centerline of the piston rod 76, effect actuation of the control valve 21 responsive to the position and direction of motion of the piston assembly 23.

A plurality of elongate tie rods 81, 82 are generally parallel to the axis of the cylinders 24L, 24R and are spaced from one another around the outer periphery of the cylinders 24L, 24R and fasten the cylinders 24L, 24R to each other. The upper tie rods 81 and lower tie rods 82 are identical and interchangeable. Spacers 83, 84 are on the tie rods 81, 82 and between the cylinders 24L, 24R. The spacers 83, 84 abut against the inboard heads 75 and space the cylinders 24L, 24R from each other. The upper spacers 83 and lower spacers 84 are of equal length and the upper spacers 83 may be utilized as lower spacers 84. Transverse slots 85 are provided on the upper spacers 84 and serve to position a pump control 86 on the upper tie rods 81 and on the pump 11.

The pump control 86 includes a mounting cradle 87 which carries the gas control valve 21, and a valve actuator 88. The cradle 87 has a pair of spaced apart transverse plates 89. Each plate 89 has a pair of keyholes 90 having flats 91 facing outward and opposed to each other in a plane defined by the axes of the two adjacent upper slotted tubes 83 and the rods 81. The flats 91 in each keyhole have a width in which the tie rods 81 slip fit, and a bore 92 substantially larger than the diameter of the tie rods 81 and the spacer tubes 83 slip fit in the bores 92. The transverse slots 85 are generally symmetrical about the fore/aft center of the tube 83 and the slots 85 register with the plates 89 and keyholes 90. The tubes 83 are slipped into the bores 92 until the slots 85 register with the flats 91. The tubes 83 are then pulled into the flats 91. The tie rods 81 are installed through the tubes 83 and keyhole flats 91 and the cradle 87 is fixed in position on the tie rods 81 by the tubes 83 and their slots 85. The keyhole bores 92 are to the inside of the keyhole flats 91 and the outsides of the keyhole flats 91 are abutted against the outside of a respective spacer tube 83 at the outside of each respective slot 85. The cradle 87 is fixed to the pump 11 at a position substantially midway between the cylinders 24L, 24R and midway between the inboard heads 76. The cradle 87 has an outward facing valve pocket 94 receiving and positioning the control valve 21. The pocket 94 is slip-fitted to the valve 21 and a screw slot 95 and a transverse screw 96 on each side of the pocket 94 releasably retains the valve 21 in the pocket 94. When the valve 21 is placed in the pocket 94 the screws 96 are tightened and the valve 21 is fastened to the pump 11. To remove the valve 21, the screws 96 are loosened and the entirety of the valve 21 together with the screws 96 is removable as a modular component. The mounting plates 89 are spaced apart from one another a distance generally equal to the length of the valve 21, and the valve 21 is positioned at the fore/aft centerline of the pump 11 and between the plates 89. A fulcrum pin 97 is on the inside of the cradle 87 at the midway point between the plates 89 and the length of the valve 21. A valve actuator 88 is pivotally or rockably journaled to the cradle 87 with and by the fulcrum pin 97. The actuator 88 is a rigid Y-shaped structure with the lower leg of the Y-shape being a follower 98 in operative engagement with the piston assembly 23. The follower 98 has bifurcated legs 99 split about the piston rod 78. The legs 99 are engaged and rocked back and forth by the drive pins 79, 80 as will be described. The follower 98 is rigidly and integrally a part of a plastic yoke 100 having two spaced apart arms 101, 102. Each arm 101, 102 has a valve hammer 103 with a rounded hammer head 104 substantially harder and less elastic than the yoke arms 101, 102. Each hammer head 104 is the generally hemispherical head of a metal pin press-fitted in the hammer 103 and is impactably engagably against the valve 21 for operation of the valve 21 as will be described.

A bi-stable biasing mechanism including springs 105 is operatively connected between the cradle 87 and the valve actuator 88. A cross pin 106 is mounted in the cradle 87 underneath the valve 21, and an interchangeably similar cross pin 107 is mounted in the follower 98 on the opposite side of the piston rod 78 from the cradle 87. There are two of springs 105, with one spring 105 being connected to each end of the cross pins 106, 107. The springs 105 are between the plates 89, and also between the actuator 88 and respective adjacent tie rods 81, 82 and spacer tubes 83, 84. The geometry between the cross pins 106, 107 and the fulcrum 97 provides bi-stable over-center operation of the springs 105 for effecting a bi-stable bias on the actuator 88. The control valve 21 is preferably of the spool type and has an anvil 108, 109 on each end of the valve spool. The anvils 108, 109 alternatively protrude outwardly from the end faces 110, 111 of the valve 21. When anvil 108 is flush with end face 110, the other anvil 109 protrudes beyond the other end face 111. When anvil 109 is then hit by a hammer head 104, this anvil 109 is driven in flush with its respective outer face 111 and the hammer head engages both the anvil 109 and outer face 111, and the opposite end anvil 108 then protrudes. After each anvil 108, 109 is driven in by the actuator 88, the respective outer face 110, 111 is structurally flush with the anvil 108, 109.

Fluid access into and from the pumping chambers 26L, 26R is through an elongate fluid intake manifold 120 and an elongate fluid outlet manifold 121. Each inboard head 76 has a first fluid port 122 and a second fluid port 123. These ports 122, 123 are identical to one another. The first ports 122 are used for intakes and the second ports 123 are used for outlets. The first outlets 122 of both inboard heads 76 face directly into each other and are aligned as are the second ports 123. The intake manifold 120 has opposed ends 124 sealingly connected to the first ports 122, and a single centrally located transverse inlet connector 126 for being connected to a source of fluid to be pumped. The outlet manifold has similar opposed ends 125 sealingly connected to the second ports 123, and a single centrally located transverse outlet connector 127. The ports 122, 123 each have an internal bore substantially larger in diameter than the outside diameter of the manifolds 120, 121, and each of the ports 122, 123 includes a removable adaptor collar 128 fluidly sealed to the bore of the ports 122, 123 and to the respective manifold ends 124, 125. An intake check valve 129 is in each of the first ports 122 between the intake manifold 120 and the pumping chambers 26L, 26R. These intake check valves 129 are disposed to allow flow from the intake manifold 120 into either of the pump chambers 26L, 26R and to preclude flow from either pump chamber 26L, 26R into the intake manifold 120. An outlet check valve 130 is in each of the second ports 123 between the outlet manifold 121 and the pumpihng chambers 26L, 26R. These outlet check valves 130 are disposed to allow flow from either pumping chamber 26L, 26R into the outlet manifold 121 and to preclude flow from the outlet manifold 121 into either of the pumping chambers 26L, 26R. The inlet check valves 129 and outlet check valves 130 are identical and interchangeable. However, the check valves 130 in the second or outlet ports 123 are installed reversed from the check valves 129 in the first or intake ports 122. All of the collars 128 are identical and interchangeable, the manifolds 120, 121 are identical and interchangeable, and the inboard heads 76 are identical and interchangeable. The check valves 129, 130 are of substantially larger diameter than the manifolds 120, 121 and are held in the ports 122, 123 by the collars 128 which abut against both of the respective check valves 129, 130 and manifold ends 124, 125. The spacing between the inboard heads 76 and the length of the manifolds 120, 121, and collars 128 and check valves 129, 130 provides a nominal end float for the manifolds 120, 121. These manifolds 120, 121 are rotatable in the inboard heads 76 and they also space apart and retain the collars 128 in the respective ports 122, 123. Each check valve 129, 130 has an internal fluid passageway 131 having a cross-sectional area generally equivalent to the cross-sectional area of the fluid passageway 132 in the manifolds 120, 121. The tie rods 81, 82 are four in number and are arranged in a square pattern around the axis of the cylinders 24, referring to FIG. 4, and the intake manifold 120 is between the right upper tie rod 81 and the most adjacent or right lower tie rod 82; the outlet manifold 121 is between the left upper tie rod 81 and the most adjacent or left lower tie rod 82. The manifolds 120, 121 are rotatable along their length and between the tie rods 81, 82 during and after connection to hoses or tubing (not shown). The pump control 86 and in particular the actuator 88, are operative in a plane perpendicular to the plane of the adjacent two upper tie rods 81, and in a plane inclusive of the axis of the cylinders 24L, 24R. The actuator 88 and the springs 105 flip-flop back and forth within the protective enclosure of the tie rods 81, 82 and the manifolds 120, 121, with the snap-action springs 105 being one on each side of the piston rod 78, and one each between the piston rod 78 and a respective manifold 120, 121.

Figure 3:
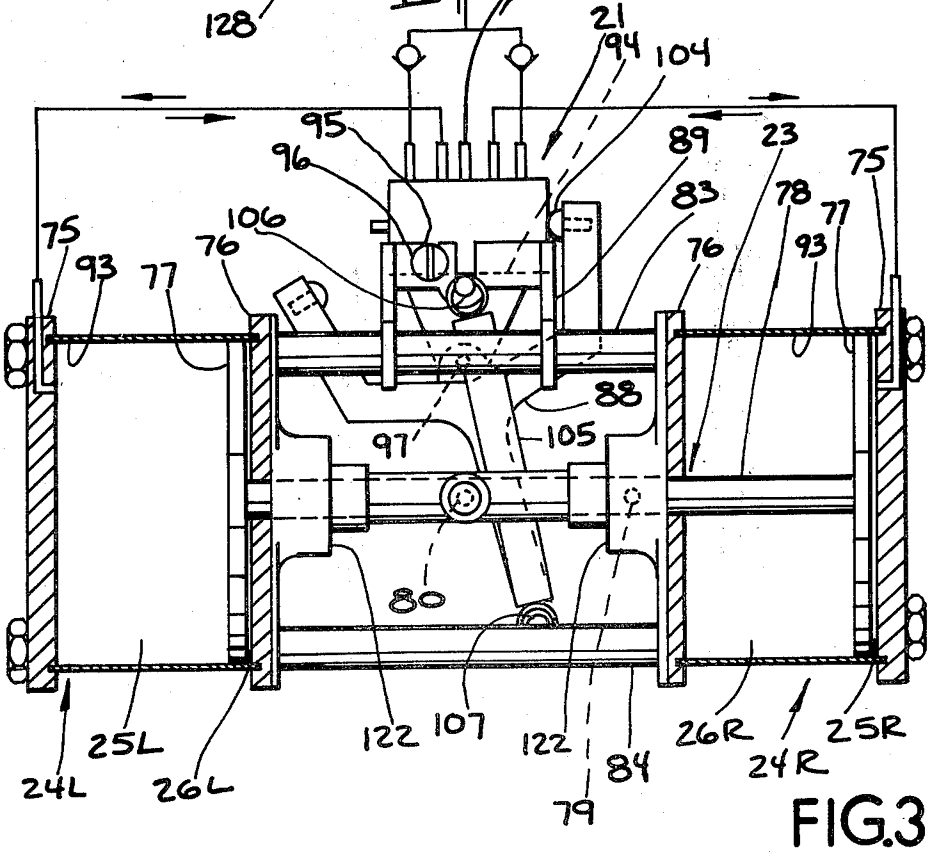
FIG. 3 is an elevational sectional view taken through lines III—III of FIG. 2.
Figure 6:
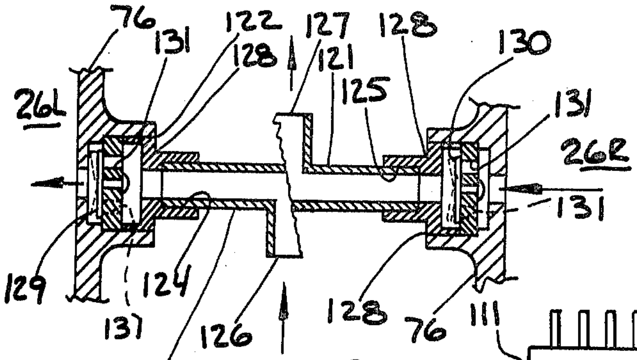
FIG. 6 is an elevational sectional view taken through lines VI—VI of FIG. 4.
Figure 5:
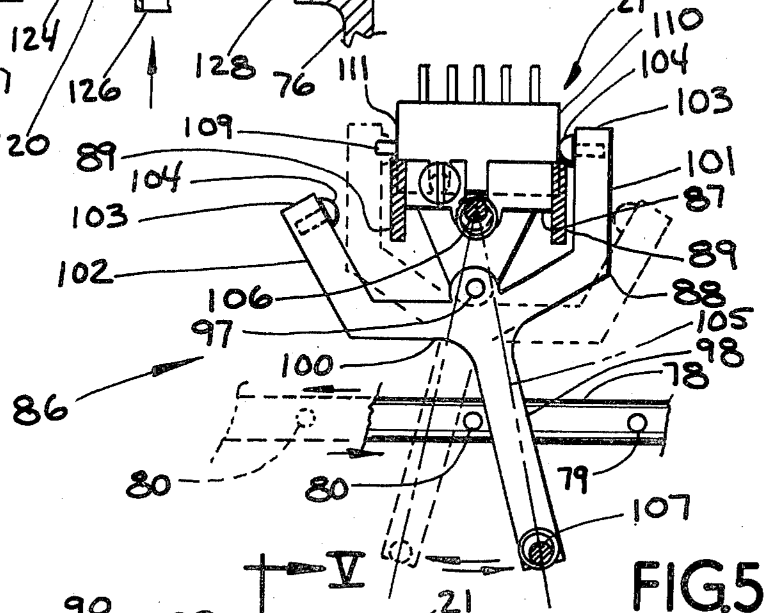
FIG. 5 is an elevational sectional view taken through lines V—V of FIG. 4.
Figure 4:
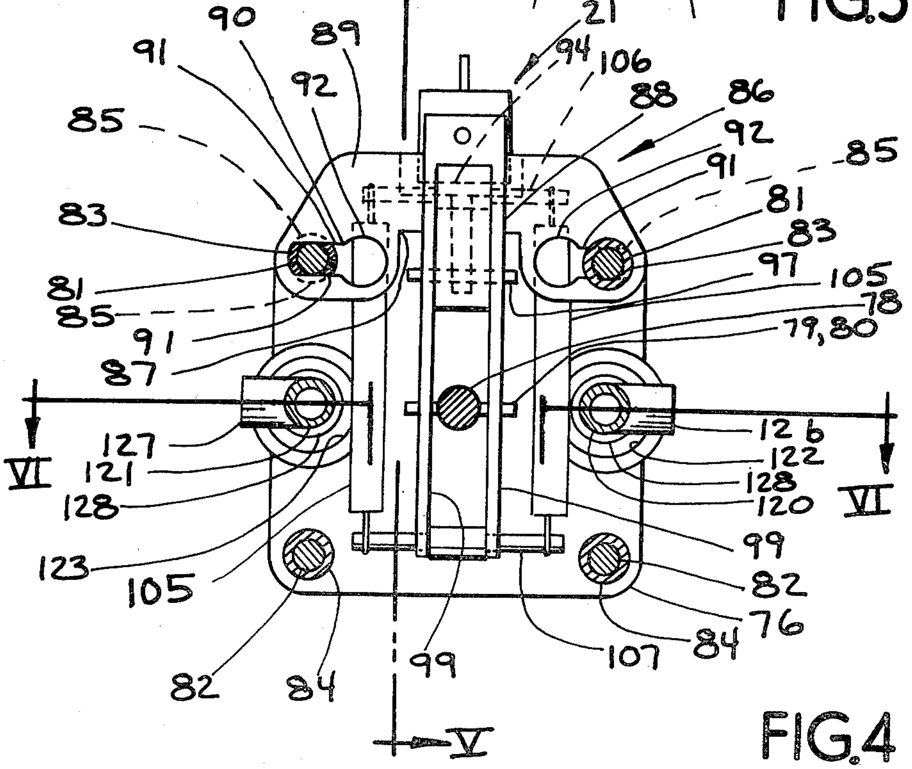
FIG. 4 is an elevational sectional view taken through lines IV—IV of FIG. 2.

In use and operation of the pump 11, compressed propellant gas is connected to the gas valve 21, the intake manifold 120 is connected to a source of fluid such as water, to be pumped, and the outlet manifold is connected to the destination to which fluid is to be pumped. The pump 11 is automatically operable when propellant pressure exceeds the pressure in the outlet manifold 121, and the pump automatically terminates operation when the pressure in the outlet manifold 121 exceeds the propellant pressure. In FIG. 3, the actuator 88 has been rocked counter clockwise. The right valve anvil 108 has been driven in. Propellant gas at propellant pressure will be supplied to the right power chamber 25R and the piston assembly 23 will move left. During this leftward movement, fluid will be pumped out of the right pumping chamber 26R via the right check valve 130 and the outlet manifold 121. Fluid will be drawn into the left pumping chamber 26L through the intake manifold 120 and left intake check valve 129. As the piston assembly 23 moves to the left, the drive pin 79 makes contact with the follower 98 and rocks the actuator 88 clockwise until the springs 105 snap over center and complete the clockwise rocking of the actuator 88. The left anvil 109 is driven in and the gas valve 21 transfers propellant pressure to the left power chamber 11 and the piston assembly 23 reserses direction and pumps from the left pumping chamber 26L and draws into the right pumping chamber 26R. As the piston assembly 23 moves to the right, the left drive pin 80 engages the follower 98 and rocks the actuator 88 counter clockwise until the springs 105 snap it over center. These motions of the piston assembly 23, actuator 88 and gas valve 21 continue and repeat automatically.

The control valve 21 is a spool type fluid valve, particularly suited for controlling flow of compressed gas, and has a body 150 within which a reciprocable spool 151 is retained by a valve cap 152.

Within the valve 21 is an insertable valve sleeve assembly 153 fitted within a sleeve bore 154 of the body 150. The sleeve assembly 153 includes a first or left sleeve 155, a second or right sleeve 156, spacer collar 157 and static seals 158 between the sleeves 155, 156 and the body 150. The collar 157 spaces the sleeves 155, 156 apart from each other and constructs a first transverse annular fluid port 159 between the sleeves 155, 156. This first port 159 is used as the inlet for compressed gas. Within the sleeves 155, 156 is an internal elongate valve bore 160 within which the spool 151 reciprocates. The first sleeve 155 has a second fluid port 161 transverse to and into the bore 160, and an outward facing annular shoulder 162 at the end of the valve bore 160. The second sleeve 156 has a similar second fluid port 163 transverse to and into the bore 160, and an outward facing annular shoulder 164. The second ports 161, 163 are spaced equidistantly from the first port 159. The spool 151 has a first seal 165 centrally positioned between the anvils 108, 109 on each end, and a second seal 166 spaced from seal 165 and adjacent the spool end having anvil 108, and another second seal 167 spaced from seal 165 and adjacent the spool end having anvil 109. To the outside of seal 166 is a spool shoulder 168 and to the outside of seal 167 is spool shoulder 169. The sleeves 155, 156, collar 157, static seals 158 are off-the-shelf standard parts from Clippard Instrument Laboratory, Inc., Cincinnati, Ohio, and the spool 151 is a shortened but otherwise standard part from the same source.

Figure 7:
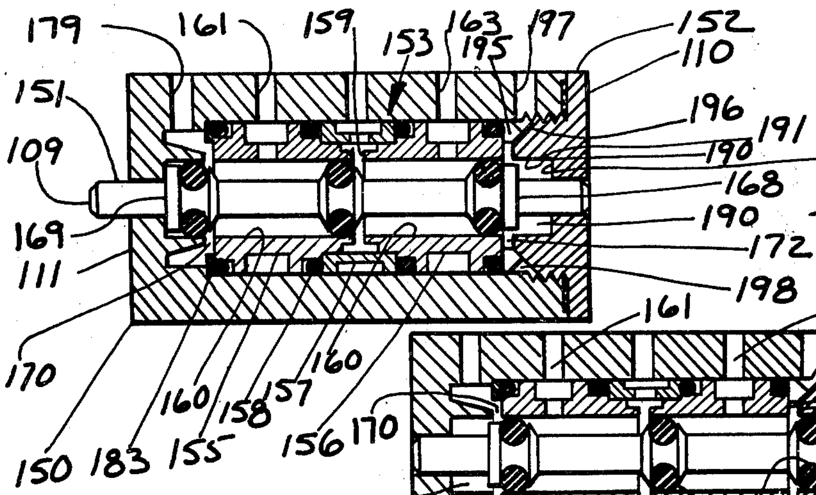
FIG. 7 is an elevational sectional view of the preferred embodiment of the fluid valve according to the present invention and which is the control valve of the pump of FIG. 2.
Figure 9:
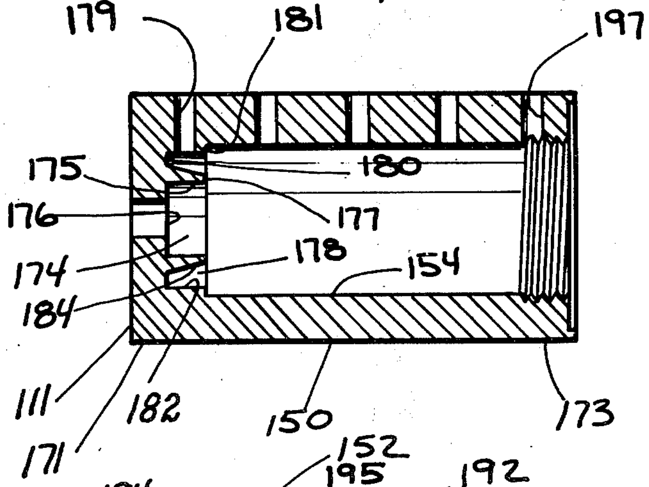
FIG. 9 is an elevational sectional view of the body of the valve of FIG. 7.

The improvement in the valve 21 includes a third port 170 on the outer end of the first sleeve 155 and in the relatively closed end 171 of the body 150, and a third port 172 on the other end of the second sleeve 156 and in the relatively open end 173 of the body 150. The block closed end 171 has a concave seal pocket 174 having a bore 175 concentric to and of substantially the same diameter as the valve bore 160 and a depth between a bottom 176 and a bounding annular face 177 for sealingly receiving spool seal 167 with the spool surface 169 abutted against the bottom 176. Abutment of the spool surface 169 against the bottom 176 positions the spool 151 and its seals 165, 166, 167 with respect to the bore 160 and the ports 159, 161, 163, 170, 172 and also positions the opposite anvil 108 substantially flush with the opposite end face 111 when anvil 108 has been hit and the second seal 167 has been reciprocated into the pocket 174 as is shown in FIG. 7. The first of the third ports 170 is formed between the annular face 177 and the sleeve shoulder 162. As best shown in FIG. 9, a toroidal plenum chamber 178 is formed in the body 150 and is in unobstructed fluid communication with the third port 170 and a fluid conduit 179 through the body 150 leading outward from the inside of the plenum chamber 178. The plenum chamber 178 has a bottom 180 substantially co-planar with the pocket bottom 174. An inward facing annular shoulder 181 in the body 150 between the sleeve bore 154 and an outer chamber surface 182 abuts against a rigid annular washer 183. The shoulder 18 is co-planar with the annular face 177 and the washer 183 spaces the sleeve 155 from the face 177 and makes the width of the third port 170 substantially equal to the thickness of the washer. The annular face 177 is of a lesser diameter than the internal diameter of the washer 183 and the minimum swept area between the washer 183 and a plenum chamber inner surface 184 exceeds the area of the third port 170. The fluid conduit 179 enters through the plenum chamber 178 and surface 182 within a space between a plane defined by the annular face 177 and a plane defined by the pocket bottom 176. The plenum chamber 178 also lies between these planes and is concentric to and about the pocket 174, and the fluid conduit 179 extends transversely from the pocket 174.

Figure 8:
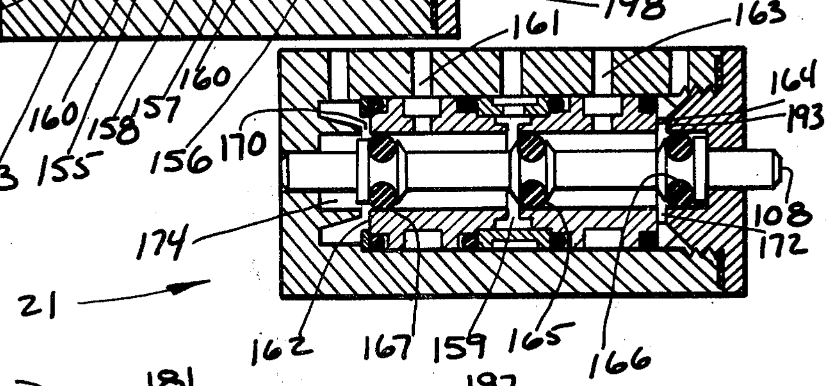
FIG. 8 is an elevational sectional view of the fluid valve of FIG. 7.
Figure 10:
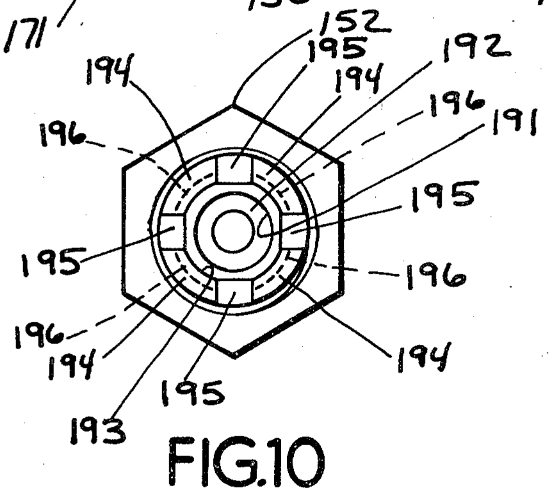
FIG. 10 is an elevational end view of the valve cap of the valve of FIG. 7.
Figure 11:
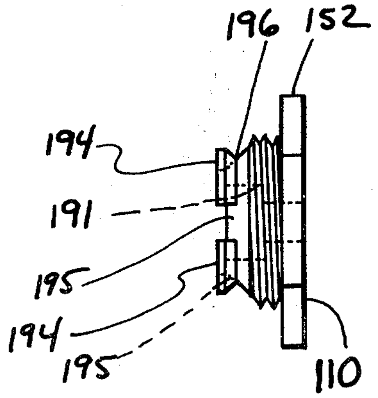
FIG. 11 is an elevational side view of the valve cap of FIG. 9.

The other or second third port 172 is between the sleeve assembly 153 and the body open end 173. The valve cap 152 has a concave seal pocket 190 having a bore 191 concentric to and substantially the same diameter as the valve bore 160 for sealingly receiving the spool seal 166. The cap pocket 190 has a bottom 192 against which the spool shoulder 128 abuts after anvil 109 has been hit and the spool 151 has been driven to the right as is shown in FIG. 8. The abutment of the shoulder 128 against the bottom 192 fixes the position of the spool 151 and its seals 165, 166, 167 with respect to the valve ports 159, 161, 163, 170, 173 and also positions the anvil 109 flush with the body end surface 111. As best shown in FIGS. 10 and 11, an annular face 193 is around and bounds the cap pocket 190. The face 193 faces toward but is spaced from the sleeve shoulder 164 with the third port 172 being annular and being defined by and being between the face 193 and the sleeve shoulder 164. A segmented inner face 194 on the cap 152 compressibly effects retention of the sleeve assembly 153 in the body 150, and also holds the assembly 153 against the washer 183 and the shoulder 181. The annular face 193 in the bottom of a counter bore which is between and concentric to the cap pocket 190 and the inner face 194, the counter bore is substantially larger in diameter than the diameter of the cap pocket 190. Leading from the counter bored face 194 are a plurality of radially spaced apart fluid passageways 195. The passageways 195 are slotted through the face 194 and lead to an annular groove 196 around the cap 152. The groove 196 is in fluid communication with and between both the passageways 195 and a fluid conduit 197 through the body 150 from the sleeve bore open end 173. The groove 196 forms together with the surface of the sleeve bore 154 a toroidal plenum chamber 198 for flow of fluid between the passageways 195 and the conduit 197. The conduit 197 is transversely positioned to the cap seal pocket 190 and is between the planes of the surfaces 192, 194. Both conduits 179, 197 are to the outside or just beyond the shoulder ends 168, 169 of the sleeve assembly 153. The third ports 170, 172 are of substantially equal width as the sleeve ends 168, 169 are equidistantly spaced from their respective seal pockets 190, 174, and the washer 183 has a thickness substantially identical to the depth of the counter bore forming the cap annular face 193, for providing the equidistant spacing and equidistant width of ports 170, 172.

In the usage and operation of the valve 21, the first port 159 is fluidly connected to a source of compressed gas, second port 161 is fluidly connected to the left cylinder power chamber 25L, second port 163 is fluidly connected to the right cylinder power chamber 25R, and third ports 170, 172 are connected to discrete check valves 44 and then together into the exhaust conduit 15. The spool 151 and its seals 165, 166, 167 are reciprocable back and forth by a mechanism such as the actuator 88 and its hammers 103. The spool 151 is stable in either of the left or right positions as shown in FIGS. 7 and 8 respectively.

In FIG. 7, the spool 151 has been driven to the left. Ports 159 and 163 are fluidly connected and incoming gas is routed from first port 159 to second port 163 and from there to the right side power chamber 25R. Ports 170 and 161 are fluidly connected and used gas is exhausted from the left power chamber 25L through port 161 to port 170 and then to the exhaust gas conduit 15. When the valve actuator 88 rocks clockwise and drives the spool 151 to the right as shown in FIG. 8, the fluid connections of FIG. 7 are disconnected. In FIG. 8, ports 159 and 161 are fluidly connected and incoming gas is routed from first port 159 to second port 161 and from there to the left side power chamber 25L. Ports 163 and 172 are fluidly connected and used gas is exhausted from the right side power chamber 25R to second port 163 and then to third port 172 and from there to the exhaust conduit 15. This improved construction of valve 21 has reduced the length of the valve 21 by almost half and has enabled reduction of the length of the pump 11 correspondingly.

The apparatus 10 and method of the present invention as previously described, are useful in a variety of conditions. The pump 11 and valve 21 are also useful in a variety of conditions. Usage is advantageous in localities or sites without water pressure, with abnormally low water pressure, and where the water may have to be remotely sourced. Usage is advantageous with disposable and non-pressurizable concentrate containers, like paper cartons. Electricity consumption is minimized and the method may be practiced without electricity if ice is used for cooling and mechanical and manual valving actuation is employed. The carbonated beverage produced has a very high level of carbonation and repeatability of the level of carbonation.

These advantages, usages and many other usages will be found and realized by those versed in the art, and although various minor modifications may be suggested and employed by those who are versed in the art, be it known that we wish to embody within the scope of the patent granted hereon all such embodiments as reasonably come within the scope of our contribution to the art.

We claim as our invention:

1. In a fluid valve of the spool type having a valve body, an elongate bore within the body, an open end in the sleeve bore for receiving a sleeve therein, at least one insertable valve sleeve within the sleeve bore and having an internal valve bore and an outward facing shoulder at one end of the valve bore, and a reciprocable valve spool within the valve bore, said spool having at least one seal thereon, the improvement in the valve body comprising the integral one-piece construction in the valve body of:

(a) a concave seal pocket in a relatively closed end of the body, said seal pocket being generally coaxial with the valve bore;

(b) an annular face around and bounding the seal pocket and facing toward the sleeve;

(c) an inwardly faing annular bottom shoulder defining a bottom of the sleeve bore, said annular shoulder facing toward the open end of the sleeve bore, and abuttingly positioning the insertable sleeve in the body with respect to the annular face;

(d) a fluid conduit through the body; and (e) surface means between the annular face and the annular shoulder defining at least part of a fluid plenum chamber into which the fluid conduit enters, for providing fluid flow from across the annular face into the conduit and vice versa.

2. The fluid valve improvement of claim 1, in which the annular face and annular shoulder are substantially co-planar.

3. The fluid valve improvement of claim 1, in which the plenum chamber surface means and the seal pocket each have a bottom surface, said bottom surfaces being generally co-planar.

4. The fluid valve improvement of claim 1, in which the fluid conduit enters through the plenum chamber surface means within a longitudinal space along an axis of the sleeve bore between a relatively transverse plane defined by the annular face and a relatively transverse plane defined by a bottom of the seal pocket.

5. The fluid valve improvement of claim 4, in which the plenum chamber is between said planes and is concentric to the seal pocket.

6. The fluid valve improvement of claim 2, including a rigid washer between the body annular shoulder and the sleeve shoulder, with there being an annular port between the annular face and the sleeve shoulder, said annular port having a width substantially equal to the thickness of the washer.

7. In a fluid valve of the spool type having a valve body, an elongate sleeve bore within the body, an open end in the sleeve bore for receiving a sleeve therein and a relatively closed end forming a bottom of the sleeve bore, an insertable valve sleeve assembly within the sleeve bore, said sleeve assembly having an internal valve bore and at least one transverse port through the sleeve into the valve bore and an outward facing annular shoulder on each end, a reciprocable spool within the valve bore, a seal on each end of the spool, and a valve cap fastened into the open end of the sleeve bore for retaining the sleeve and spool within the body; the improvement comprising:

(a) a fluid port between the sleeve assembly and the closed end of the body, said fluid port being defined by an integral valve body and having (1)receiving means integrally in the closed end of the valve body, for reciprocably receiving therein the most adjacent spool valve seal, (2) abutment means integrally in the closed end of the valve body, said abutment means spacing the most adjacent sleeve assembly shoulder from the receiving means for forming the fluid port therebetween, (3) a fluid plenum chamber defined within and by the valve body, said chamber being around the receiving means and the fluid port, and (4) a fluid conduit through the valve body from the plenum chamber; together with (b) a second fluid port between the sleeve assembly and the open end of the body, having (2) receiving means in an inner side of the valve cap for reciprocably receiving the most adjacent spool valve seal, (2) abutment means on the inner side of the valve cap, said cap abutment means spacing the most adjacent sleeve assembly shoulder from the receiving means for forming the second fluid port therebetween, (3) a fluid passageway through the abutment means to the periphery of the valve cap, and (4) a second fluid conduit through the valve body and in fluid communication with the fluid passageway.

8. The valve improvement of claim 7, in which the abutment means in the closed end comprises an annular shoulder forming a bottom of the sleeve bore, and a rigid washer abutted against and between the sleeve bore annular shoulder and the adjacent sleeve assembly annular shoulder, and in which the valve cap includes a counterbore between its abutment means and its receiving means, the thickness of the washer and the depth of the counterbore being sized to equidistantly space both receiving means from a respective adjacent sleeve assembly shoulder.

9. The valve improvement of claim 8, in which the washer has a thickness substantially equal to the depth of the counterbore.

10. The improvement in a spool type fluid valve having a body, an elongate bore within the body, a first fluid port transverse to and into the bore, a second fluid port transverse to and into the bore and spaced along the length of the bore from the first port, a reciprocable spool having first and second seals spaced from each other and being sealingly engagable with the bore, with the first seal being reciprocable past the first port, comprising (a) a third port from the bore, said third port being spaced along the bore from the second port, with the second port being between the first and third ports;

(b) a concave seal pocket in the body and of substantially the same diameter as the bore, said pocket being coaxial with the bore and being of a depth sufficient for receiving the second seal, the third port being between the pocket and the bore and the second seal being reciprocable past the third port and alternately from the bore into the pocket and vice versa;

(c) a toroidal plenum chamber formed at least partially within the body and in unobstructed fluid communication with the third port, said chamber being substantially coaxial with the pocket;

(d) a fluid conduit through the body and leading outward from the inside of the chamber; and (e) a bottom in each of the seal pocket and plenum chambers, said bottoms being substantially co-planar.

11. The improvement in a spool type fluid valve having a body, a sleeve bore within the body, a sleeve within the sleeve bore, said sleeve having therein an elongate valve bore and an external annular shoulder adjacent an end of the valve bore, a first fluid port transverse to and into the bore, a second fluid port transverse to and into the bore and spaced along the length of the bore from the first port, a reciprocable spool having first and second seals spaced from each other and being sealingly engagable with the bore, with the first seal being reciprocable past the first port, comprising (a) a third port from the bore, said third port being spaced along the bore from the second port, with the second port being between the first and third ports;

(b) a concave seal pocket in the body and of substantially the same diameter as the bore, said pocket being coaxial with the bore and being of a depth sufficient for receiving the second seal and being within and bounded by an annular face which is spaced from and facing toward the valve bore, the third port being between the pocket and the bore and being defined by the spacing between the annular face and a shoulder defining an end of the valve bore facing toward the annular face with the second seal being reciprocable past the third port and alternately from the bore into the pocket and vice versa;

(c) a toroidal plenum chamber formed at least partially within the body and in unobstructed fluid communication with the third port, said chamber being substantially coaxial with the pocket;

(d) a fluid conduit through the body and leading outward from the inside of the chamber;

(e) an inward facing annular shoulder in the body between the sleeve bore and an outer chamber surface of the plenum chamber; and (f) a rigid annular washer abutting in between the inward facing annular shoulder and the sleeve shoulder, said washer spacing the valve bore from the annular face around the seal pocket.

12. The fluid valve improvement of claim 11, in which the inward facing shoulder and the annular face around the seal pocket are substantially co-planar with one another, and in which the third port has a width substantially equal to the thickness of the washer.

13. The fluid valve improvement of claim 12, in which said annular face bounding the seal pocket is of a lesser diameter than an internal diameter of the washer.

14. The fluid valve improvement of either of claims 11, 12 or 13, in which the minimum swept area between the washer and an inner surface of the plenum chamber exceeds the cross-sectioned area of the third port.

* * * * *